US008345639B2

(12) United States Patent
Hensley et al.

(10) Patent No.: US 8,345,639 B2

(45) Date of Patent: Jan. 1, 2013

(54) BROAD PROPAGATION PATTERN ANTENNA

(75) Inventors: Marion P. Hensley, Pendleton, IN (US); Matthew R. Dexter, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 340 days.

(21) Appl. No.: 12/815,256

(22) Filed: Jun. 14, 2010

(65) Prior Publication Data

US 2011/0305174 A1 Dec. 15, 2011

(51) Int. Cl.
*H04W 4/00* (2009.01)

(52) U.S. Cl. ........................................................ 370/334

(58) Field of Classification Search ........................ None
See application file for complete search history.

(56) References Cited

U.S. PATENT DOCUMENTS 5,548,299 A * 8/1996 Tsuda et al. .................. 343/789
5,828,344 A 10/1998 Alder et al.
7,710,343 B2 5/2010 Chiu et al.
7,800,549 B2 9/2010 Rebeiz et al.
7,812,778 B2 10/2010 Hasegawa
2003/0190897 A1 10/2003 Lei et al.
2005/0042988 A1 2/2005 Hoek et al.
2005/0156804 A1 7/2005 Ratni et al.
2008/0304686 A1* 12/2008 Meskens et al. .............. 381/330
2009/0067363 A1* 3/2009 Ruiz et al. ..................... 370/315
2009/0137215 A1* 5/2009 Rofougaran .................... 455/83

FOREIGN PATENT DOCUMENTS

EP 0 045 254 2/1982
EP 0 045 254 A1 2/1982
FR 2 925 233 6/2009
FR 2 925 233 A1 6/2009
JP 6 177635 A 6/1994
JP 06177635 6/1994

OTHER PUBLICATIONS

Yamazaki Kenji, European Patent Office English translation of Abstract of Japan Application #04351092, Jul. 6, 1992.*
PCT, Notification of Transmittal of the International Search Report and the Written Opinion of the International Searching Authority, or the Declaration, International Application No. PCT/US2011/037829, International Filing date May 25, 2011, (10 pages), Oct. 11, 2011.
Notification of Transmittal of the International Search Report and the Written Opinion of the International Searching Authority, or the Declaration, PCT/US2011/037829, date of mailing Oct. 11, 2011, 4 pages.
Written Opinion of the International Searching Authority, PCT/US2011/037829, date of mailing Oct. 11, 2011, 6 pages.

* cited by examiner

*Primary Examiner* — Jianye Wu
(74) *Attorney, Agent, or Firm* — Daly, Crowley, Mofford & Durkee, LLP

(57) ABSTRACT

An antenna includes a diplexer having a high pass filter coupled to first and second radiating elements and a low pass filter coupled to third and fourth radiating elements, the first and second radiating elements oriented in a different direction relative to the third and fourth radiating elements. Signals are transmitted to or receive from the first and second radiating elements with a greater intensity relative to the intensity with which the signals are transmitted to or received from the third and fourth radiating elements when the signal frequencies are above a low pass roll-off frequency of the low pass filter. Signals are transmitted to or received from the third and fourth radiating elements with a greater intensity relative to the intensity with which the signals are transmitted to or received from the first and second radiating elements when the signal frequencies are below a high pass roll-off frequency of the high pass filter.

19 Claims, 3 Drawing Sheets

BROAD PROPAGATION PATTERN ANTENNA

TECHNICAL FIELD OF THE DISCLOSURE

This disclosure generally relates to antennas, and more particularly, to a broad propagation pattern antenna.

BACKGROUND

Wireless signaling is often facilitated by antennas that transmit and/or receive electro-magnetic radiation. Antennas convert electro-magnetic radiation to or from electrical signals that are processed by electrical circuits, such as those included in walkie-talkies, remote controllers, or other wireless communication devices. In general, antennas typically comprise one or more conductive elements having dimensional characteristics that allow the antennas to resonate at certain frequencies for improved coupling of the electrical signals to a medium, such as the atmosphere, in which electro-magnetic radiation is propagated.

SUMMARY

In accordance with certain embodiments of the present disclosure, disadvantages and problems associated with certain prior antennas may be reduced or eliminated.

An antenna includes a diplexer having a high pass filter coupled to first and second radiating elements and a low pass filter coupled to third and fourth radiating elements, the first and second radiating elements oriented in a different direction relative to the third and fourth radiating elements. Signals are transmitted to or receive from the first and second radiating elements with a greater intensity relative to the intensity with which the signals are transmitted to or received from the third and fourth radiating elements when the signal frequencies are above a low pass roll-off frequency of the low pass filter. Signals are transmitted to or received from the third and fourth radiating elements with a greater intensity relative to the intensity with which the signals are transmitted to or received from the first and second radiating elements when the signal frequencies are below a high pass roll-off frequency of the high pass filter.

Certain embodiments of this disclosure may provide one or more technical advantages. For example, one embodiment of the antenna may provide improved link margin for wireless control systems in which either the antenna's transmitting or receiving radio is operated as a hand-held device. Because antennas configured in hand-held devices generally cannot be maintained in a fixed orientation relative to their complementary radios, the level of link margin may suffer if directional antennas such as dipole antennas are used. Certain antennas according to the teachings of the present disclosure may provide a solution to this problem by redundantly transmitting messages at differing frequencies through a diplexer that alternatively directs energy through two or more antennas oriented at differing orientations relative to one another. Thus, at least one of the two or more antennas may have an orientation relative to the antenna's complementary radio for maintaining a sufficient level of link margin.

Certain embodiments of the present disclosure may provide some, all, or none of these advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which like reference numbers indicate like features and wherein.

DESCRIPTION OF EXAMPLE EMBODIMENTS

Figure 1:
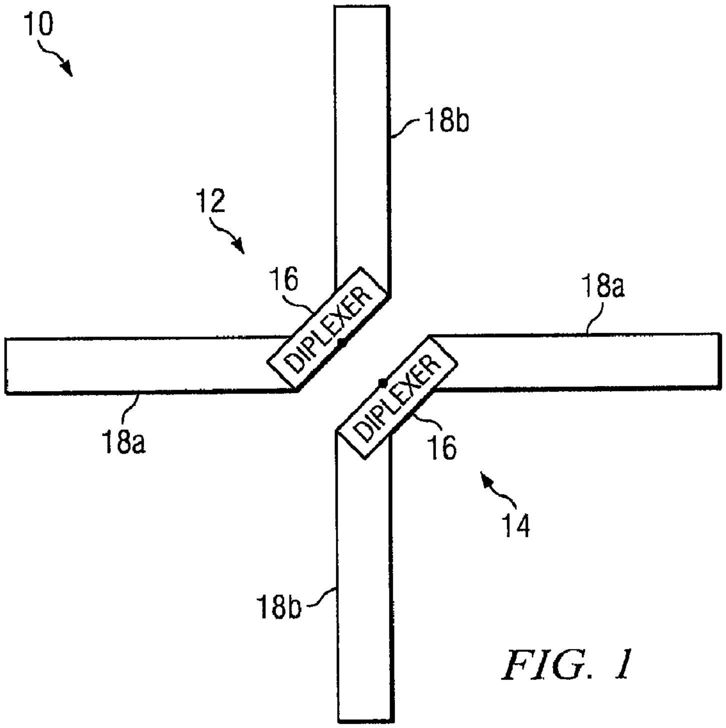
FIG. 1 illustrates one embodiment of a broad propagation pattern antenna according to the teachings of the present disclosure.

FIG. 1 illustrates one embodiment of a broad propagation pattern antenna 10 according to the teachings of the present disclosure. Antenna 10 includes a first antenna sub-structure 12 and a second antenna sub-structure 14 configured as shown. First antenna sub-structure 12 includes a diplexer 16 with two radiating elements 18*a* and 18*b* that in this particular embodiment, are orthogonal relative to one another. Likewise, second antenna sub-structure 14 includes a diplexer 16 with two radiating elements 18*a* and 18*b* that are orthogonal relative to one another. As will be described in detail below, first antenna sub-structure 12 and second antenna sub-structure 14 are arranged together such that radiating element 18*a* of first antenna sub-structure 12 and radiating element 18*a* of second antenna sub-structure 14*a* predominantly transmit or receive signals at certain frequencies, while radiating element 18*b* of first antenna sub-structure 12 and radiating element 18*b* of second antenna sub-structure 14 predominantly transmit or receive signals at different frequencies than those transmitted by radiating elements 18*a*.

In the particular embodiment shown, radiating elements 18*a*, and radiating elements 18*b* each form a dipole antenna. In this respect, radiating element 18*a* of antenna sub-structure 12 is generally co-linear with radiating element 18*a* of antenna sub-structure 14, while radiating element 18*b* of antenna sub-structure 12 is generally co-linear with radiating element 18*b* of antenna sub-structure 14. In other embodiments, radiating elements 18*a*, or radiating elements 18*b* may be any suitable type, such as patch antennas, slot antennas, or horn antennas.

Radio-frequency (RF) communications may be facilitated using antennas that convert electrical signals to and/or from electro-magnetic radiation. To accommodate various types of RF communication, differing types of antennas have been developed. For example, some antennas may be designed to be directional in nature such that they exhibit relatively good gain in one direction while having reduced gain in other directions. In other cases, antennas may be omnidirectional such that they may transmit and/or receive electro-magnetic radiation equally in most or all directions. One particular application for RF communications includes wireless controllers in which a slave mechanism may be controlled from a remote location. Such slave mechanisms may include entertainment systems having various features such as volume or channel selection that may be remotely controlled, or garage door openers that opens or closes garage doors in response to actuation signals remotely transmitted by a remote controller device.

Some applications of wireless controllers may require a relatively high level of reliability. For example, wireless controllers may be used by law enforcement or military personnel to actuate certain slave mechanisms, such as explosives or other type of ordinances. The ability of slave mechanisms of this type to function properly when commanded are often limited by the level of link margin between the transmitter and its associated receiver. The term "link margin" generally refers to a difference between the sensitivity level of the slave mechanism and its actual received signal power. Thus, the reliability of wireless controllers may be directly proportional to the level of link margin maintained between the slave mechanism and its associated transmitter.

Numerous techniques have been implemented to maintain a link margin sufficient to provide a minimum level of reliability. One technique has been to orient the transmitting and receiving antennas relative to one another such that good coupling, and distortion free propagation from transmitter to receiver is maintained. This technique, however, has been relatively difficult to accomplish in applications where the slave mechanisms and/or their associated transmitters are operated as hand-held or otherwise hand-carried equipment whose orientation is not fixed. Another technique has been to increase the power of the transmitted signal. This technique, however, often increases the size and/or weight of the hand-carried equipment due to increased battery size.

Certain embodiments of this disclosure may provide one or more technical advantages. For example, one embodiment of the antenna may provide improved link margin for wireless control systems in which either the antenna's transmitting or receiving radio is operated as a hand-held device. Because antennas configured in hand-held devices generally can not be maintained in a fixed orientation relative to their complementary radios, the level of link margin may suffer if directional antennas such as dipole antennas are used. Certain antennas according to the teachings of the present disclosure may provide a solution to this problem by redundantly transmitting messages at differing frequencies through a diplexer that alternatively directs energy through two or more antennas oriented at differing orientations relative to one another. Thus, at least one of the two or more antennas may have an orientation relative to the antenna's complementary radio for maintaining a sufficient level of link margin.

Figure 2:
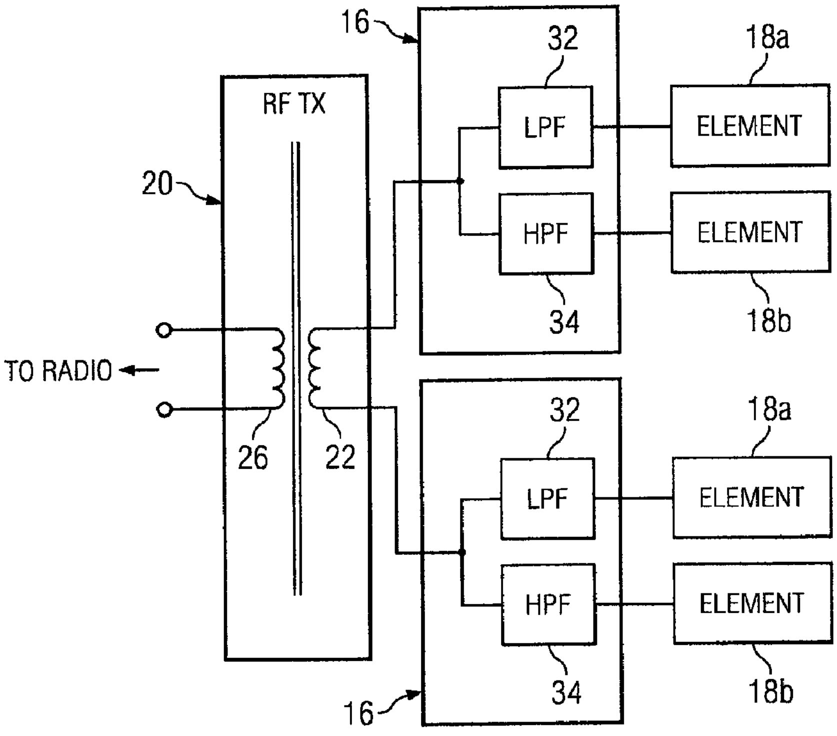
FIG. 2 illustrates several example components that may be implemented with the example antenna of FIG. 1.

FIG. 2 illustrates several example components that may be implemented with the example antenna of FIG. 1. A transformer 20 is included that couples antenna 10 to a radio that may be any suitable device that radio-frequency transmitting or receiving device. Transformer 20 has a first coil 22 and a second coil 26 that are magnetically coupled to one another. One end of first coil 22 is coupled to diplexer 16 of first antenna sub-structure 12, while the other end of first coil 22 is coupled to diplexer 16 of second antenna sub-structure 14. Respective ends of first coil 22 are 180 degrees out of phase with one another. Thus, radiating element 18*a* of antenna sub-structure 12 and radiating element 18*a* of antenna sub-structure 14 may be driven 180 degrees out of phase relative to one another. Likewise, radiating element 18*b* of antenna sub-structure 12 and radiating element 18*b* of antenna sub-structure 14 may be driven 180 degrees out of phase relative to one another.

Each diplexer 16 includes a low pass filter 32 and a high pass filter 34. The low pass filter 32 of each diplexer 16 is coupled to respective radiating elements 18*a*. Conversely, the high pass filter 34 of each diplexer 16 is coupled to respective radiating elements 18*b*. Thus, the low pass filter 32 and high pass filter of each diplexer 16 causes electrical energy to be diverted to radiating elements 18*a* at lower frequencies, and electrical energy to be diverted to radiating elements 18*b* at higher frequencies.

Low pass filters 32 and high pass filters 34 may be any suitable type. In some embodiments, low pass filters and high pass filters 34 may be include active circuitry, or passive components, such as capacitors and/or inductors. The type of components used may be based upon desired operating parameters of antenna 10. For example, low pass filters 32 and/or high pass filters 34 may be implemented as single-order filters having only a single reactive element, such as an inductor or capacitor, respectively. In other cases, low pass filters 32 and/or high pass filters 34 may be implemented as multi-order filters having multiple reactive and/or active components. In general, low pass filters 32 generally filter electrical signals above a low pass roll-off frequency, while high pass filters 34 filter electrical signals below a high pass roll-off frequency. The order of each low pass filter 32 and high pass filter 34 determining the degree of roll-off or attenuation of the electrical signal as a function of its frequency in relation to the low pass roll-off frequency or high pass roll-off frequency, respectively.

Figure 3:
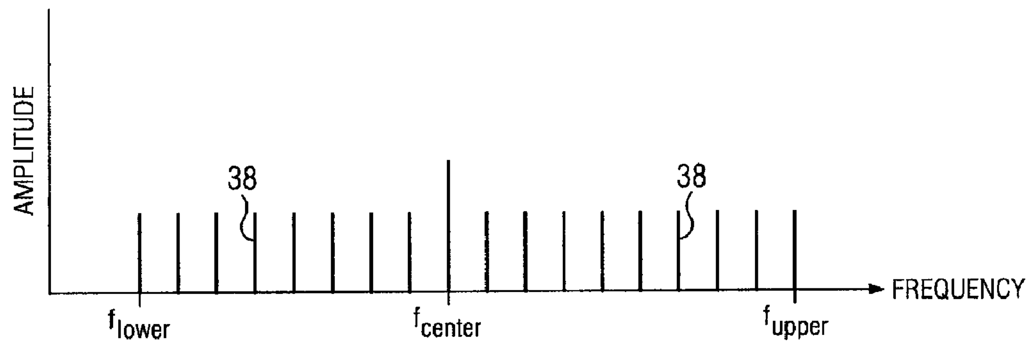
FIG. 3 illustrates a frequency spectrum graph showing one embodiment of a transmission technique that may be generated by a radio coupled to the example antenna of FIG. 1.

FIG. 3 illustrates a frequency spectrum graph showing one embodiment of a transmission technique that may be generated by a radio coupled to the example antenna 10 of FIG. 1. The radio generates multiple relatively short bursts 38 of electrical energy at frequencies above and below a center frequency $f_{center}$. The transmission technique shown is commonly referred to as a frequency hopping technique where multiple bursts 38 of electrical energy are generated between an lower frequency $f_{lower}$ and an upper frequency $f_{upper}$. In other embodiments, any suitable type of transmission technique may be implemented for use with antenna 10 that generates signals above and below a specified center frequency $f_{center}$.

In the particular transmission technique shown, the low pass roll-off frequency of low pass filters 32, and the high pass roll-off frequency of high pass filters 34 are configured to be substantially equivalent to the center frequency $f_{center}$. Thus, bursts 38 of electrical energy through antenna 10 above center frequency $f_{center}$ may predominantly excite radiating elements 18*b*, while those below center frequency $f_{center}$ may predominantly excite radiating elements 18*a*. If the high pass roll-off frequency of high pass filters 34 are substantially equivalent to the low pass roll-off frequency of low pass filters 32, bursts 38 of electrical energy at or close to center frequency $f_{center}$ may be transmitted with equal intensity through antenna elements 18*a*, and antenna elements 18*b*.

Wireless communications implementing frequency hopping transmission techniques may be ideally suited for wireless controllers that control the operation of one or more slave mechanisms. For example, certain slave mechanisms may be configured to operate according to receipt of a wireless message representing a relatively simple command, such as turning a switch on or off. In a military or law enforcement context, slave mechanisms may be configured to actuate an explosive or other similar ordinance in response to receipt of a wireless message. In such cases, it would be beneficial to have the explosive actuated when commanded with a relatively high degree of reliability. Thus in one embodiment, a transmitter configured with antenna 10 may be configured to transmit multiple, redundant command messages at differing frequencies to increase the likelihood of reception of at lease one command message by its corresponding receiver.

Figure 4:
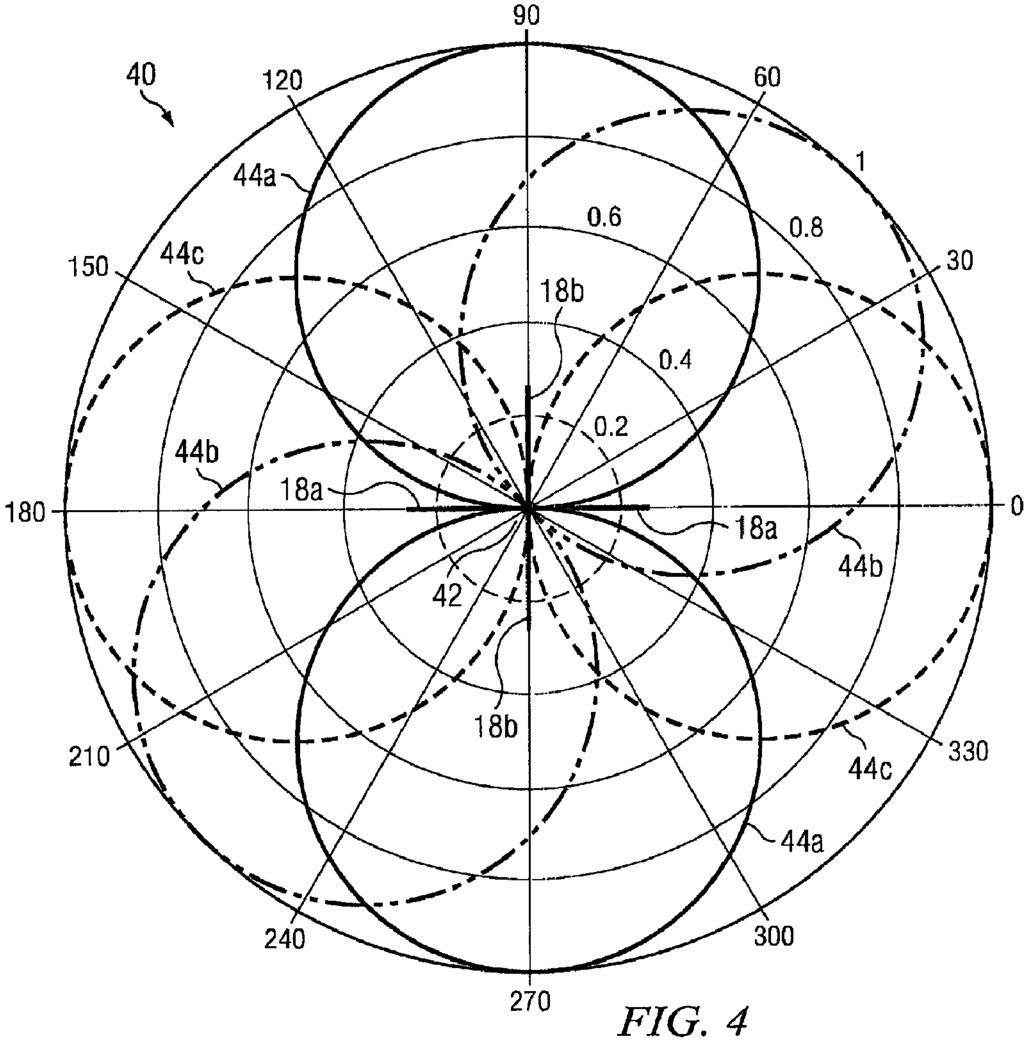
FIG. 4 illustrates a two-dimensional propagation chart showing an example combined propagation pattern that may be generated by the example antenna of FIG. 1 due to excitation at differing frequencies.

FIG. 4 illustrates a two-dimensional propagation chart showing an example combined propagation pattern 40 that may be generated by the example antenna 10 of FIG. 1 due to excitation at differing frequencies. Point 42 denotes the location of antenna 10. Combined propagation pattern 40 includes several lobe pairs 44*a*, 44*b*, and 44*c* representing individual propagation patterns generated by antenna 10 at differing frequencies. As can be seen, each lobe pair 44*a*, 44*b*, and 44*c* generates an individual propagation pattern that is characteristic of a dipole antenna.

Lobe pair 44*a* represents the individual propagation pattern that may be generated when antenna 10 is excited with electrical energy with a frequency less than the center frequency $f_{center}$ of low pass filters 32 and high pass filters 34. Lobe pair 44*b* represents the individual propagation pattern that may be generated when antenna 10 is excited with electrical energy with a frequency relatively close to the center frequency $f_{center}$ of low pass filters 32 and high pass filters 34. Lobe pair 44*c* represents the individual propagation pattern that may be generated when antenna 10 is excited with electrical energy with a frequency greater than the center frequency $f_{center}$ of low pass filters 32 and high pass filters 34.

In one embodiment, center frequency $f_{center}$ of the frequency hopping transmission technique is selected to be at or near the corner frequency of low pass filters 32 and high pass filter 34 of diplexers 16. In this manner, electro-magnetic radiation may be emitted in a relatively equivalent manner from radiating elements 18*a* and radiating elements 18*b*.

Thus, it can be seen that antenna 10 may provide a relatively broad combined propagation pattern when excited with electrical energy above and below the center frequency $f_{center}$ of low pass filters 32 and high pass filters 34. Certain embodiments of a wireless controller implemented with antenna 10 may provide enhanced reliability by providing a relatively broad propagation pattern such that relatively good coupling between its transmitter and receiver may be maintained when antenna 10 is oriented at differing orientations relative to its complementary antenna. This characteristic may be particularly advantageous for certain wireless controllers in which the transmitter portion comprises a hand-held or otherwise hand-carried device whose orientation is not fixed relative to its corresponding receiver portion.

Figure 5:
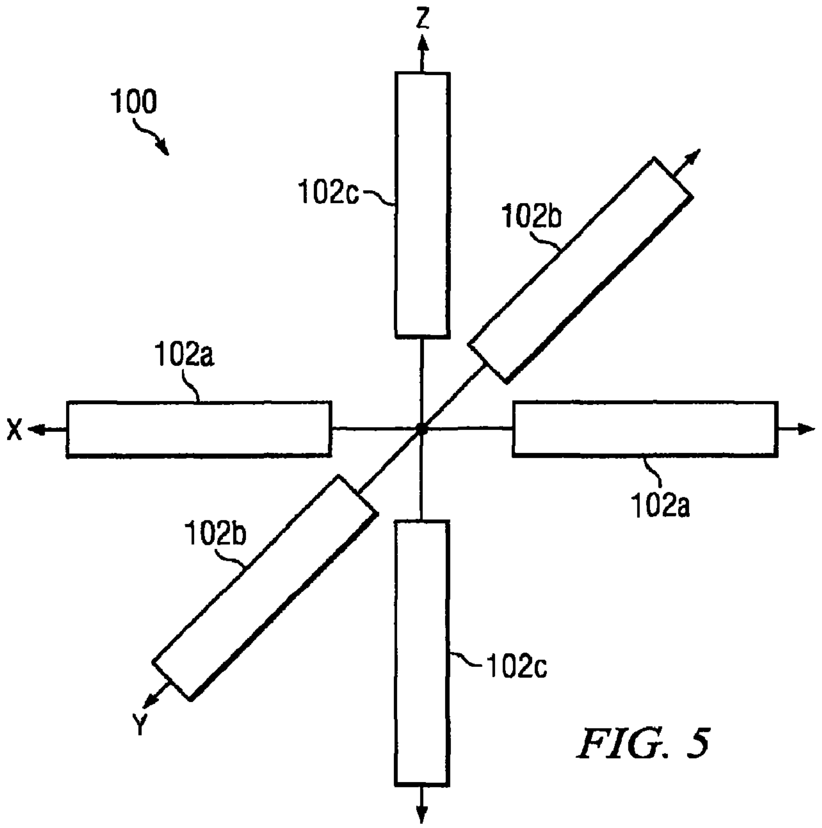
FIG. 5 illustrates another embodiment of an example antenna according to the teachings of the present disclosure.

FIG. 5 illustrates another embodiment of an example antenna 100 according to the teachings of the present disclosure. Antenna 100 has multiple antenna elements 102*a*, 102*b*, and 102*c* that are similar in design and construction to the antenna elements 18*a* and 18*b* of FIG. 1. Antenna 100 differs, however, in that it incorporates three pairs of antennas 102*a*, 102*b*, and 102*c* having orientations that differ from one another for providing a relatively broader combined propagation pattern than would otherwise be provided individually be a single pair of antenna elements.

In the particular embodiment shown, the three pair of antenna elements 102*a*, 102*b*, and 102*c* are configured orthogonally relative to one another such that antenna 100 provides a relatively broad combined propagation pattern in all three dimensions outwardly from antenna 100. Thus, certain embodiments of antenna 100 configured in a hand-held device may provide relatively good link margin while being held in virtually any orientation relative to its complementary antenna.

Figure 6:
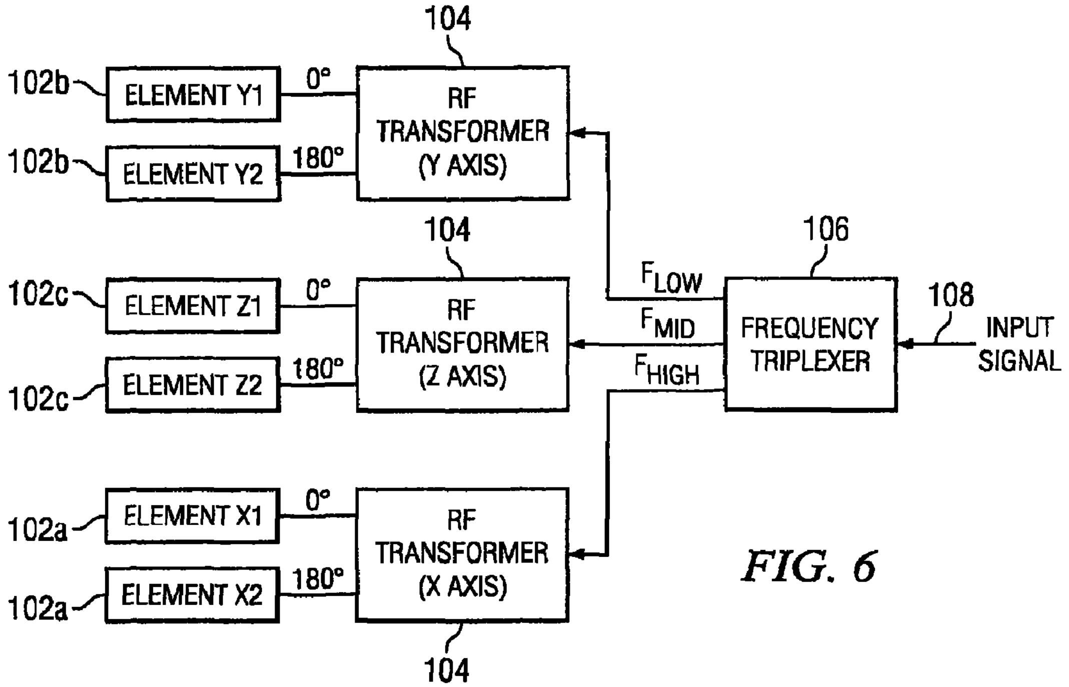
FIG. 6 illustrates several components that may be implemented with the example antenna of FIG. 5.

FIG. 6 illustrates several components that may be implemented with the example antenna 100 of FIG. 5. Each pair of antenna elements 102*a*, 102*b*, and 102*c* is coupled to a transformer 104 that excites each antenna element with a 180 degree phase shift. Each transformer 104 is driven by a triplexer 106 that splits an input signal 108 into three independent signals according to the frequency of input signal 108. For example, triplexer 106 may include a low pass filter that is coupled to antenna elements 102*a*, a bandpass filter that is coupled to antenna elements 102*b*, and a high pass filter that is coupled to antenna elements 102*c*. Thus, triplexer 106 may filter electrical energy from input signal such that lower frequencies are predominantly transmitted through antenna elements 102*a*, higher frequencies are predominantly transmitted through antenna elements 102*c*, and frequencies in a band pass region between the lower frequencies and the higher frequencies are predominantly transmitted through antenna elements 102*b*.

Modifications, additions, or omissions may be made to antenna 10 or 100 without departing from the scope of the disclosure. The components of antenna 10 or 100 may be integrated or separated. For example, antenna elements 18*a* and 18*b*, or 102*a*, 102*b*, and 102*c* may be formed in a manner to include capacitive or inductive characteristics such that high pass filters 34 or low pass filters 32 may at least be partially integrated with its associated antenna elements 18*a* and 18*b*, or 102*a*, 102*b*, and 102*c*. Moreover, the operations of antenna 10 or 100 may be performed by more, fewer, or other components. For example, diplexer 16 or triplexer 106 may include other circuitry for conditioning electrical signals in a manner suitable for operating in any desirable application. As used in this document, "each" refers to each member of a set or each member of a subset of a set.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. An antenna comprising:

an antenna port;

first and second radiating elements forming a first dipole antenna;

third and fourth radiating elements forming a second dipole antenna that is oriented orthogonally relative to the orientation of the first dipole antenna, the first radiating element being co-linear to the second radiating element and the third radiating element being co-linear to the fourth radiating element; and at least one diplexer comprising at least one high pass filter coupled between the antenna port and the first and second radiating elements and at least one low pass filter coupled between the antenna port and the third and fourth radiating elements, the at least one high pass filter to attenuate signals below a high pass roll-off frequency that are propagating between the antenna port and the first and second radiating elements, and the at least one low pass filter to attenuate signals above a low pass roll-off frequency that are propagating between the antenna port and the third and fourth radiating elements, wherein the low pass roll-off frequency is substantially equivalent to the high pass roll-off frequency.

2. An antenna comprising:

an antenna port;

first and second radiating elements;

third and fourth radiating elements that are oriented in a direction different from the orientation of the first and second radiating elements; and at least one diplexer comprising at least one high pass filter coupled between the antenna port and the first and second radiating elements and at least one low pass filter coupled between the antenna port and the third and fourth radiating elements, the at least one high pass filter to attenuate signals below a high pass roll-off frequency that are travelling between the antenna port and the first and second radiating elements, and the at least one low pass filter to attenuate signals above a low pass roll-off frequency that are travelling between the antenna port and the third and fourth radiating elements.

3. The antenna of claim 2, wherein:

the high pass roll-off frequency is substantially equivalent to the low pass roll-off frequency:

wherein, if a first having a frequency that is below the high pass roll-off frequency is applied to the antenna port, the first signal appears at the first and second radiating elements at a higher intensity than at the third and fourth radiating elements;

wherein, if a second signal having a frequency that is above the high pass roll-off frequency is applied to the antenna port, the second signal appears at the third and fourth radiating elements at a higher intensity than at the first and second radiating elements; and wherein, if a third signal having a frequency substantially equal to the high pass roll-off frequency is applied to the port, the third signal appears at the first, second, third, and fourth radiating elements at substantially the same intensity.

4. The antenna of claim 2, wherein the first radiating element is substantially co-linear with the second radiating element, and the third radiating element is substantially co-linear with the fourth radiating element.

5. The antenna of claim 2, wherein the antenna further comprises a radio device coupled to the antenna port to redundantly transmit or receive a message to or from a wireless channel via the antenna at frequencies above the high pass roll-off frequency and below the low pass roll-off frequency.

6. The antenna of claim 5, wherein the radio device comprises a wireless controller in which the transmitted or received message is to actuate a slave mechanism.

7. The antenna of claim 2, wherein the first and second radiating elements are oriented orthogonally relative to the third and fourth radiating elements.

8. The antenna of claim 2, wherein the first and second radiating elements comprise a first dipole antenna and the third and fourth radiating elements comprise a second dipole antenna.

9. The antenna of claim 2, further comprising at least one transformer between the antenna port and the first, second, third, and fourth radiating elements.

10. The antenna of claim 2, further comprising:

fifth and sixth radiating elements that are orientated in a direction different from the orientations of the first, second, third, and fourth radiating elements;

wherein the diplexer is part of a triplexer that includes a band pass filter coupled between the antenna port and the fifth and sixth radiating elements, the band pass filter to attenuate signals outside of a band pass region that are travelling between the antenna port and the fifth and sixth radiating elements.

11. A wireless communication method for use with an antenna having an antenna port coupled to first, second, third, and fourth radiating elements, the method comprising:

high pass filtering signals travelling between the antenna port and the first and second radiating elements of the antenna, wherein high pass filtering includes attenuating signals below a high pass roll-off frequency; and low pass filtering signals travelling between the antenna port and the third and fourth radiating elements of the antenna, wherein low pass filtering includes attenuating signals above a low pass roll-off frequency which is substantially equivalent to the high pass roll-off frequency;

wherein the third and fourth radiating elements are oriented in a direction different from the orientation of the first and second radiating elements.

12. The wireless communication method of claim 11, wherein the wireless communication method further comprises:

applying a first signal having a frequency that is below the high pass roll-off frequency to the antenna port, wherein the first signal appears at the first and second radiating elements at a higher intensity than at the third and fourth radiating elements;

applying a second signal having a frequency that is above the low pass roll-off frequency to the antenna port, wherein the second signal appears at the third and fourth radiating elements at a higher intensity than at the first and second radiating elements; and applying a third signal having a frequency substantially equal to the high pass roll-off frequency to the antenna port, wherein the third signal appears at the first, second, third, and fourth radiating elements at substantially the same intensity.

13. The wireless communication method of claim 11, wherein the first radiating element is substantially coLlinear with the second radiating element, and the third radiating element is substantially co-linear with the fourth radiating element.

14. The wireless communication method of claim 11, further comprising:

transmitting or receiving a message, using a radio coupled to the antenna port, by redundantly transmitting or receiving a plurality of signals some of which are above the high pass roll-off frequency and some of which are below the high pass roll-off frequency.

15. The wireless communication method of claim 14, further comprising:

actuating a slave mechanism using the transmitted or received messages.

16. The wireless communication method of claim 11, wherein the first and second radiating elements are oriented orthogonally relative to the third and fourth radiating elements.

17. The wireless communication method of claim 11, wherein the first and second radiating elements comprise a first dipole antenna and the third and fourth radiating elements comprise a second dipole antenna.

18. The wireless communication method of claim 11, wherein:

the antenna includes at least one transformer between the antenna port and the first, second, third, and fourth radiating elements.

19. The wireless communication method of claim 11, wherein:

the antenna further comprises fifth and sixth radiating elements coupled to the antenna port, the fifth and sixth radiating elements being orientated in a direction different from the orientations of the first, second, third, and fourth radiating elements; and the wireless communication method further comprises band pass filtering signals travelling between the antenna port and the fifth and sixth radiating elements of the antenna.

* * * * *